US012446758B2

(12) United States Patent
Han et al.

(10) Patent No.: US 12,446,758 B2
(45) Date of Patent: Oct. 21, 2025

(54) MAGNETIC CONTROL DEVICE AND MAGNETICALLY CONTROLLED CAPSULE ENDOSCOPE SYSTEM

(71) Applicant: Ankon Medical Technologies (Shanghai) Co., LTD., Shanghai (CN)

(72) Inventors: Chao Han, Shanghai (CN); Shaobang Zhang, Shanghai (CN); Xiaodong Duan, Pleasanton, CA (US)

(73) Assignees: ANKON MEDICAL TECHNOLOGIES (SHANGHAI) CO., LTD., Shanghai (CN); ANX IP HOLDING PTE. LTD., Singapore (SG)

( * ) Notice: Subject to any disclaimer, the term of this patent is extended or adjusted under 35 U.S.C. 154(b) by 409 days.

(21) Appl. No.: 18/015,530

(22) PCT Filed: Jul. 9, 2021

(86) PCT No.: PCT/CN2021/105593
§ 371 (c)(1),
(2) Date: Jan. 10, 2023

(87) PCT Pub. No.: WO2022/007963
PCT Pub. Date: Jan. 13, 2022

(65) Prior Publication Data
US 2023/0255450 A1    Aug. 17, 2023

(30) Foreign Application Priority Data
Jul. 10, 2020   (CN) .......................... 202010664939.9

(51) Int. Cl.
*A61B 1/00*    (2006.01)
*A61B 1/04*    (2006.01)

(52) U.S. Cl.
CPC ...... *A61B 1/00133* (2013.01); *A61B 1/00158* (2013.01); *A61B 1/041* (2013.01)

(58) Field of Classification Search
CPC .. A61B 1/00133; A61B 1/00158; A61B 1/041
See application file for complete search history.

(56) References Cited

U.S. PATENT DOCUMENTS

2008/0300458 A1* 12/2008 Kim ...................... A61B 34/73
600/118
2013/0110128 A1   5/2013 Schostek et al.
(Continued)

FOREIGN PATENT DOCUMENTS

| CN | 1705459 A | 12/2005 |
|---|---|---|
| CN | 106963325 A | 7/2017 |
| CN | 109259716 A | 1/2019 |

*Primary Examiner* — Aaron B Fairchild
(74) *Attorney, Agent, or Firm* — Treasure IP Group, LLC

(57) ABSTRACT

The present invention provides a magnetic control device and a magnetically controlled capsule endoscope system. The magnetic control device comprises a mounting base, a base, a magnetic component, a first motor and a second motor. The mounting base is for hoisting the magnetic control device, the base is connected to the mounting base, the magnetic component comprises a magnet for driving the capsule endoscope to rotate, the first motor drives the magnetic component to rotate around a first axis, and the first motor passes through the mounting base and is arranged on the base along a first direction, the second motor drives the magnetic component to rotate around a second axis, the second motor is arranged on the base, and the first axis intersects the second axis. By reasonably utilizing a mounting space of the magnetic control device, the structure is more compact, small and convenient to move.

12 Claims, 4 Drawing Sheets

(56) References Cited

U.S. PATENT DOCUMENTS

| | | | |
|---|---|---|---|
| 2015/0018614 A1* | 1/2015 | Duan | A61B 1/041 600/109 |
| 2015/0380140 A1* | 12/2015 | Duan | H01F 7/0257 600/109 |
| 2019/0200986 A1 | 7/2019 | Shelton, IV et al. | |

* cited by examiner

MAGNETIC CONTROL DEVICE AND MAGNETICALLY CONTROLLED CAPSULE ENDOSCOPE SYSTEM

CROSS-REFERENCE OF RELATED APPLICATIONS

The application is a National Phase Application of PCT International Application No. PCT/CN2021/105593, International Filing Date Jul. 9, 2021, published Jan. 13, 2022 as International Publication Number WO2022/007963A1, which claims priority from Chinese Patent Application No. 202010664939.3, filed Jul. 10, 2020, all of which are incorporated herein by reference in their entirety.

FIELD OF INVENTION

The present invention relates to the technical field of capsule endoscope control systems, and more particularly to a magnetic control device and a magnetically controlled capsule endoscope system.

BACKGROUND

Currently, capsule endoscopy is a relatively advanced diagnostic and therapeutic means on the market for routine examination of human digestive tract. Compared with traditional intubation type endoscope, swallowing a capsule endoscope does not cause physical and psychological discomfort to a patient, and also reduce the possibility of cross-infection.

Magnetically controlled capsule endoscope system is a capsule endoscope system that enables an active control of the examination field of view by an operator on a control console. A common method is to place a magnetic device in vitro. Based on an external magnetic field of the magnetic device, a magnet built in the magnetically controlled capsule endoscope system drives the capsule endoscope to move in vivo so as to realize an active adjustment of the examination field of view of the capsule endoscope. However, a current magnet control device is large and bulky, which requires a lot of space.

SUMMARY OF THE INVENTION

The present invention provides a magnetic control device which has the characteristics of simple structure and small size.

In the embodiments of the present invention, a magnetic control device is provided for controlling a capsule endoscope, and the magnetic control device comprises:
  a mounting base for hoisting the magnetic control device and a base connected to the mounting base;
  a magnetic component, comprising a magnet for driving the capsule endoscope to rotate;
  a first motor used for controlling the magnetic component to rotate around a first axis, wherein the first motor passes through the mounting base and is mounted on the base along a height direction of the magnetic control device;
  a second motor for controlling the magnetic component to rotate around a second axis, wherein the second motor is mounted on the base;
  wherein the first axis intersects the second axis.

In one possible design, the base comprises an upper base and a lower base;
  the upper base is located between the mounting base and the lower base along the first direction of the magnetic control device, and a space between the mounting base and the lower base is a mounting space.

In one possible design, an outer edge of the lower base extends beyond an outer edge of the upper base.

In one possible design, the first motor is mounted on the upper base, and the second motor is connected to the lower base and is disposed in the mounting space between the mounting base and the lower base.

In one possible design, the magnetic control device further comprises a mounting plate connected to the base;
  at least part of the mounting plate extends to the mounting space, and the second motor is connected to the base through the mounting plate.

In one possible design, the magnetic control device further comprises a conductive slip ring which comprises an upper slip ring and a lower slip ring;
  the upper slip ring is mounted on the upper base and is electrically connected to a power supply of the magnetic control device, and the lower slip ring is mounted on the lower base and is electrically connected to the second motor.

In one possible design, the conductive slip ring is a PCB type slip ring and the thickness of the PCB type slip ring is less than or equal to 10 mm.

In one possible design, the magnetic component further comprises a housing within which the magnet is secured;
  the housing comprises a left housing and a right housing, wherein the left housing is connected to the right housing through a flange, and the magnet is secured in the housing.

In one possible design, two ends of the lower base are provided with connecting plates along a second direction of the magnetic control device, and the two connecting plates extend away from the upper base along the first direction of the magnetic control device;
  the housing is located between the two connecting plates and is rotatably connected to the two connecting plates, and the housing rotates as driven by the first motor and the second motor.

In one possible design, the magnetic control device further comprises at least one rotation origin detection mechanism for determining whether the magnetic component is at an origin of rotation;
  the rotation origin detection mechanism comprises a switch assembly electrically connected to the first motor and/or the second motor, and a switch mating member cooperates with the switch assembly to control the on/off of a control circuit.

In one possible design, the rotation origin detection mechanism is mounted between the upper base and the lower base, the switch assembly is mounted on one of the upper base or the lower base, and the switch mating member is mounted on the other of the upper base or the lower base. The first motor is controlled to start and stop through a relative rotation between the switch assembly and the switch mating member. In one possible design, the rotation origin detection mechanism is mounted at a position where the lower base and the magnetic component are connected, the switch assembly is mounted on one of the lower base or the magnetic component, and the switch mating member is mounted on the other of the lower base or the magnetic component. The second motor is controlled to start and stop through a relative rotation between the switch assembly and the switch mating member.

In one possible design, the switch assembly is a photoelectric switch, the switch mating member is a code disk, and the code disk is provided with a detection portion;

along with a relative rotation between the photoelectric switch and the code disk, when the photoelectric switch detects the detection portion, the control circuit of the photoelectric switch is disconnected, and the magnetic component stops at the origin of rotation.

In one possible design, the switch assembly is a microswitch group, and the switch mating member is a contact mating portion;

along with a relative rotation between the microswitch group and the contact mating portion, when the microswitch group detects the contact mating group, a control circuit of the microswitch group is disconnected, and the magnetic component stops at the origin of rotation.

In one possible design, the first motor and/or the second motor is a DC motor or a stepper motor.

The present invention further provides a magnetically controlled capsule endoscope system, which comprises the magnetic control device, wherein the magnetic control device is mounted on the magnetically controlled capsule endoscope system through the mounting base.

The technical solution provided by the present invention can achieve the following beneficial effects.

The area covered by the projection of the mounting base forms a mounting space, the second motor is positioned in the mounting space, the mounting space is reasonably utilized, and the first motor and the second motor are mounted, so that the structure is more compact and smaller, and is convenient to move.

It should be understood that the above description and the details to be set forth in the following text are only exemplary, which are not intended to limit the present invention.

MARKS IN THE DRAWINGS

Figure 1:
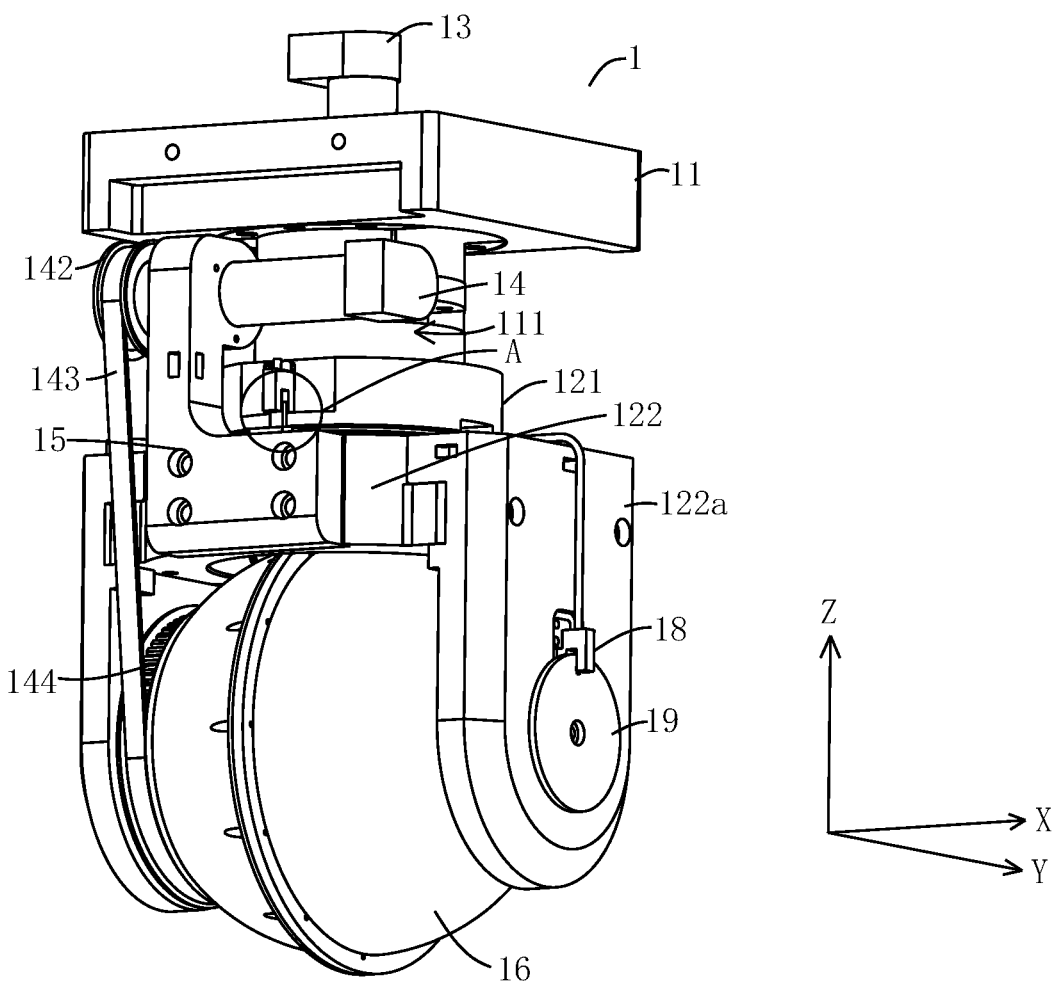
FIG. 1 is a schematic illustration of an exemplar embodiment of a magnetic control device according to the aspects of the present invention.
Figure 2:
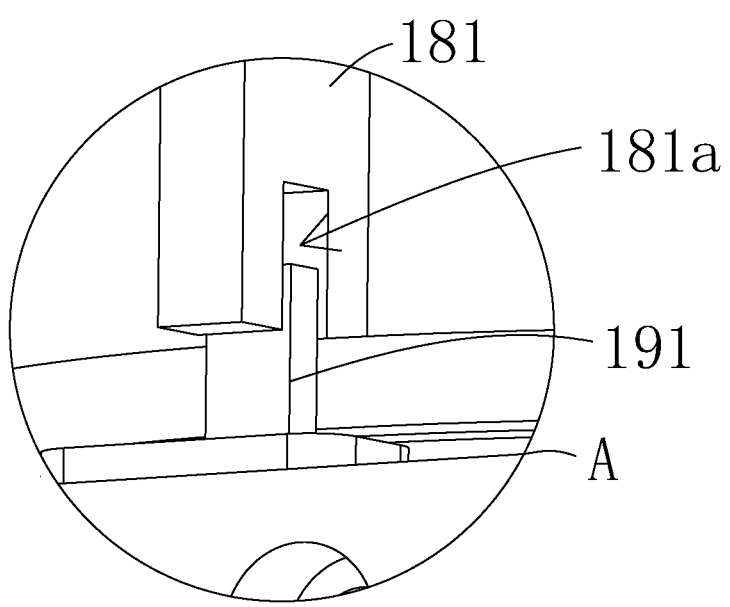
FIG. 2 is an enlarged view of a portion A in FIG. 1.

1—Magnetic control device;
11—Mounting base;
111—Mounting space;
12—Base;
121—Upper base;
122—Lower base;
122*a*—Connecting plate;
13—First motor;
131—First coupling;
132—Connecting shaft;
133—Spindle;
134—Bearing;
135—Locking nut;
136—Shaft sleeve;
14—Second motor;
141—Second coupling;
142—First timing belt pulley;
143—Timing belt;
144—Second timing belt pulley;
15—Mounting plate;
16—Magnetic component;
161—Magnet;
162—Housing;
162*a*—Left housing;
162*b*—Right housing;
162*c*—Flange;
162*d*—Shaft portion;
18—Photoelectric switch;
181—First photoelectric switch;
181*a*—First groove;
182—Second photoelectric switch;
182*a*—Second groove;
19—Code disk;
191—First code disk;
192—Second code disk;
192*a*—Opening;
20—Conductive slip ring;
201—Upper slip ring;
202—Lower slip ring.

The drawings herein are incorporated in and constitute a part of the specification, illustrate the embodiments consistent with the present invention and are used together with the specification to explain the principles of the present invention.

DETAILED DESCRIPTION

The present invention can be understood and appreciated more fully from the following detailed description taken in conjunction with the accompanying drawings.

It should be clear that the described embodiments are only part of the embodiments of the present invention. Based on the embodiments in the present invention, all other embodiments obtained by ordinary technicians in the art without doing creative work belong to the scope of protection in the present invention.

The present invention is described in detail below with reference to the accompanying drawings and preferred embodiments.

At present, a common means for controlling a "capsule endoscope" is to place a magnet outside a human body, and through an orderly changing magnetic field around the magnet caused by changing the orientation and posture of the magnet, a magnet built in a magnetically controlled capsule endoscope is controlled to drive the capsule endoscope to move, so as to realize a change of the examination field of view of the capsule endoscope. However, a magnetic control device installed with the magnet outside a human body is bulky and heavy.

For example, the magnetic control device comprises a support base, a vertical rotation motor, a horizontal rotation motor, a magnetic ball and a magnetic ball mounting bracket. The support base is used for hoisting the magnetic control device, the vertical rotation motor and the horizontal rotation motor are generally installed on the left side and the right side of the support base, the magnetic ball is installed on the magnetic ball mounting bracket, and the magnetic ball mounting bracket is installed below the support base and is rotationally connected to the support base through a bearing. The vertical rotation motor and the horizontal rotation motor control the magnetic ball mounting bracket to rotate so as to drive the magnetic ball to rotate, causing the magnetic field around the magnetic ball to change orderly, and further controlling the motion of the capsule endoscope in vivo. The support base is used for fixing the magnetic control device, and is large in size. The vertical rotation motor and the horizontal rotation motor are installed on two sides of the support base, and a transmission chain between the vertical rotation motor and/or the horizontal rotation motor and the magnet ball is long, so that the overall volume of the magnetic control device is increased, which needs a large enough working space for placing the magnetic control device, and the large volume of the magnetic control device makes the magnetic control device not easy to move.

As shown in FIG. 1 to FIG. 7, in order to solve the above technical problem, the present invention provides a magnetically controlled capsule endoscope system, which comprises a magnetic control device 1. The magnetically controlled capsule endoscope system is used for controlling a capsule endoscope which is ingested into a human body to move so as to completely observe gastrointestinal tract of a human body and make a diagnosis. The magnetic control device 1 comprises a mounting base 11, a base 12, a magnetic component 16, a first motor 13, and a second motor 14. The mounting base 11 is used for hoisting the magnetic control device 1, the magnetic control device 1 is mounted on a bracket of the capsule endoscope system through the mounting base 11, and the magnetic control device 1 is fixed to the bracket through the mounting base 11. The bracket refers to an external device for installing the magnetic control device 1, which is usually installed on the ground and can drive the magnetic control device 1 to move back and forth, up and down, and left and right, so as to correspondingly move to a position close to a patient for test. The base 12 is fixedly connected below the mounting base 11, and the magnetic component 16 comprises a magnet 161 for driving the capsule endoscope to rotate. The first motor 13 is used for controlling the magnetic component 16 to rotate around a first axis L1, and the first motor 13 passes through the mounting base 11 and is mounted on the base 12 along a first direction of the magnetic control device 1. The second motor 14 is used for controlling the magnetic component 16 to rotate around the second axis L2, and the second motor 14 is mounted on the base 12. The first axis L1 intersects the second axis L2.

The first direction of the magnetic control device 1 can be set as a height direction Z of the magnetic control device 1 (as shown in FIG. 1). In the following embodiments, the first direction is the height direction Z as an example.

In the embodiments of the present invention, the mounting base 11 is disposed on the magnetic control device 1, the base 12 is fixed below the mounting base 11, and the first motor 13 passes through the mounting base 11 and is installed on the base 12. A mounting space 111 is reasonably used to install the first motor 13 and the second motor 14, so that the structure is more compact and small, and it is convenient for the magnetic control device 1 to move.

The first motor 13 and the second motor 14 may be a DC motor or a stepper motor. In the present invention, a DC motor or a stepper motor is used instead of a servo motor, so that the magnetic control device 1 does not need an encoder and/or a reducer, and the first motor 13 or/and the second motor 14 are driven by timing belt pulleys, which reduce the requirements for torque of the motors, thereby reducing the overall volume of the magnetic control device 1. Alternatively, other motors that can drive the magnetic component 16 to rotate with high precision and that are relatively small in size may also be used.

Figure 3:
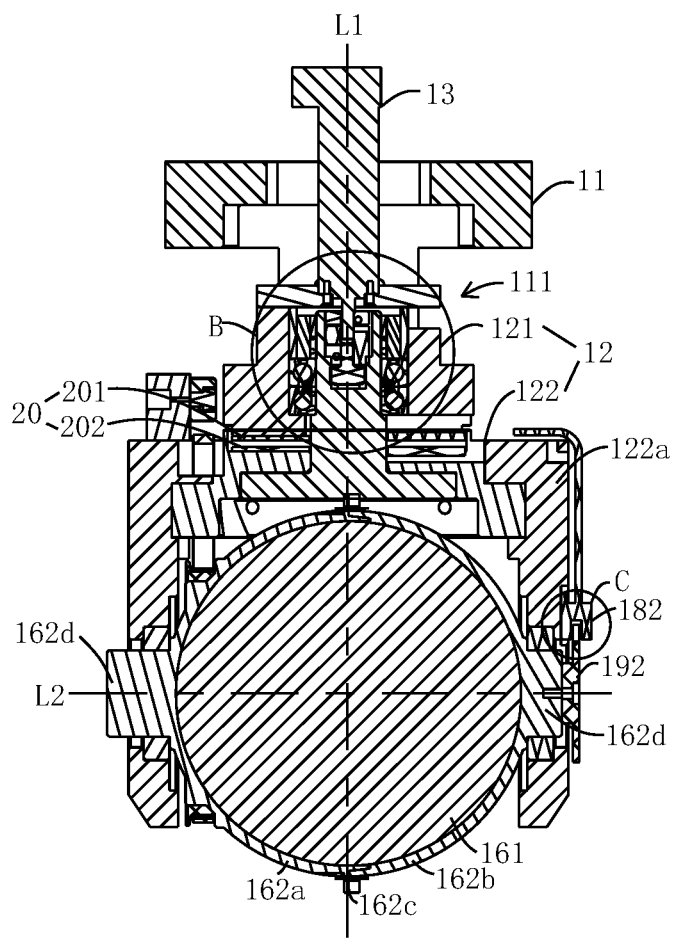
FIG. 3 is a sectional view of FIG. 1.
Figure 6:
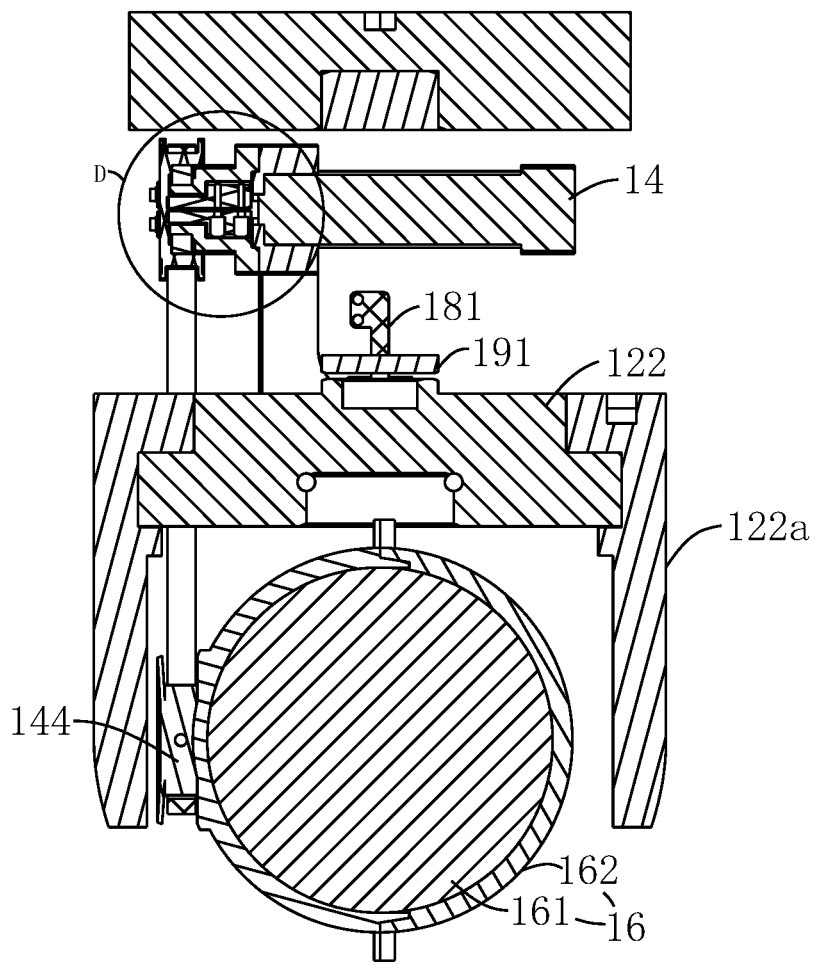
FIG. 6 is a sectional view of FIG. 1 in another direction.

As shown in FIG. 1, FIG. 3 and FIG. 6, in one possible design, the base 12 comprises an upper base 121 and a lower base 122, the first motor 13 is mounted on the upper base 121, and the second motor 14 is connected to the lower base 122. Along the height direction Z of the magnetic control device 1, the upper base 121 is located between the mounting base 11 and the lower base 122. Along the height direction Z of the magnetic control device 1, a space between the mounting base 11 and the lower base 122 is a mounting space 111, and an outer edge of the lower base 122 extends beyond an outer edge of the upper base 121.

In the embodiment, the outer edge of the lower base 122 extends beyond the outer edge of the upper base 121, so that there is a redundant mounting space 111 between the mounting base 11 and the lower base 122 except for the upper base 121. Further, the second motor 14 can be arranged in the mounting space 111 and be mounted on the lower base 122, so that the overall volume is more compact, and the space utilization rate of the magnetic control device 1 is effectively improved. After being installed, the base 12, the first motor 13 and the second motor 14 do not exceed the range covered by the projection of the mounting base 11, so that the magnetic control device 1 has the characteristics of compact structure and small volume. More specifically, the second axis L2 around which the second motor 14 controls the magnetic component 16 to rotate is perpendicular to the first axis L1 around which the first motor 13 controls the magnetic component 16 to rotate. At this time, the rotating shaft of the first motor 13 is in the vertical direction, and the rotating shaft of the second motor 14 is in the horizontal direction. Compared with the prior art in which the first motor 13 and the second motor 14 are both vertically mounted on the base 12, in this embodiment, the first motor 13 and the second motor 14 are so installed that the mounting space is greatly saved and the volume of the magnetic control device 1 can be further reduced.

As shown in FIG. 1 and FIG. 6, in one possible design, the magnetic control device 1 further comprises a mounting plate 15 connected to the base 12. Along the height direction Z of the magnetic control device 1, at least part of the mounting plate 15 extends to the mounting space 111, and the second motor 14 is connected to the base 12 through the mounting plate 15. The second motor 14 is connected to the lower base 122 through the mounting plate 15, which simplifies the overall structure of the lower base 122.

As shown in FIG. 3, further, a conductive slip ring 20 is installed between the upper base 121 and the lower base 122. The conductive slip ring 20 is used to conduct electricity for the second motor 14, and the conductive slip ring 20 comprises an upper slip ring 201 and a lower slip ring 202. The upper slip ring 201 and the lower slip ring 202 can ensure electrical connection therebetween while rotating relative to each other. The upper slip ring 201 is mounted on the upper base 121 and the lower slip ring 202 is mounted on the lower base 122. The upper slip ring 201 is electrically connected to a power supply (not shown), and the lower slip ring 202 can be electrically connected to the second motor 14. In a working state, the upper slip ring 201 can conduct electricity to the lower slip ring 202, so as to prevent the second motor 14 from being connected to the power supply with a long wire, and the wire may be twisted with the rotation of the lower base 122. It should be noted that the above power supply may be a power supply of the magnetic control device 1 in the present invention (including a power supply provided on the magnetic control device 1), or may be an external power supply on a device for assembling the magnetic control device 1, or the magnetic control device 1 may be connected to an electric supply, which cannot be described here.

The conductive slip ring 20 may be a PCB (Printed Circuit Board) type slip ring, and the thickness of the PCB type slip ring is less than or is equal to 10 mm. Compare with other types of conductive slip ring, the PCB type slip ring has a smaller thickness, can reduce the structure in the height direction Z, and is favorable for compacting the overall size of the magnetic control device 1.

As shown in FIG. 3, in one possible design, the magnetic component 16 further comprises a housing 162, and the magnet 161 is secured within the housing 162. The housing 162 comprises a left housing 162a and a right housing 162b, and the left housing 162a and the right housing 162b are connected by a flange 162c. In the embodiment, the left housing 162a and the right housing 162b are fixedly connected by the flange 162c. Specifically, the left housing 162a is fixed to a flange (the flange may be formed integrally with the left housing 162a), the right housing 162b is fixed to another flange (which may be formed integrally with the right housing 162b), a flange gasket is placed between the two flanges, and the two flanges are tightened by bolts to be tightly combined, such that the left housing 162a and the right housing 162b are fixedly connected. Compared with drilling a plurality of threaded holes in peripheral edges of the left housing 162a and the right housing 162b, the fixed connection of the left housing 162a and the right housing 162b by the flange 162c is more convenient and firm by tightening the threaded holes by a plurality of screws in sequence. In addition, in the embodiment of the present invention, it is not necessary to drill threaded holes in the housing 162 to ensure the sealing performance in the housing 162, and at least four positions are required for threaded connection between the left housing 162a and the right housing 162b, which is cumbersome to install and remove, while the flange 162c is more convenient to install and remove. Further, the connection strength between the left housing 162a and the right housing 162b by the flange 162c is high, and the sealing performance in the housing 162 is good.

As shown in FIG. 3, in one possible design, along a second direction Y of the magnetic control device 1, both ends of the lower base 122 are provided with a connecting plate 122a, and along the height direction Z of the magnetic control device 1, the two connecting plates 122a extend away from the upper base 121. The housing 162 is located between the two connecting plates 122a, and is rotatably connected to the two connecting plates 122a. The housing 162 is capable of rotating under the driving of the first motor 13 and the second motor 14. In the embodiment, the housing 162 drives the magnet 161 inside to rotate, so that the magnetic field around the magnet 161 changes. A small magnet is built in the capsule endoscope in vivo, and the small magnet drives the capsule endoscope to move under the action of the external changing magnetic field, so as to realize the change of the examination field of view of the capsule endoscope. Moreover, the connecting plate 122a extends in a direction away from the upper base 121, and the housing 162 is connected to the connecting plate 122a, so that the magnet 161 is away from the first motor 13 and the second motor 14, thereby reducing the influence of magnetic field interference on the first motor 13 and the second motor 14.

Specifically, when the first motor 13 is driven to work, the first motor 13 drives the lower base 122 to rotate through a rotating shaft thereof, and the lower base 122 drives the housing 162 to rotate through the connecting plates 122a, so that the housing 162 drives the magnet 161 to rotate along with the rotating shaft of the first motor 13, which changes the magnetic field in which the capsule endoscope is located and thereby changes the examination field of view of the capsule endoscope. When the second motor 14 is driven to work, the second motor 14 drives a drive assembly to rotate through a rotating shaft thereof, and the drive assembly is connected to the housing 162, so that the housing 162 drives the magnet 161 to rotate along with the rotating shaft of the second motor 14, which changes the magnetic field in which the capsule endoscope is located, and thereby changes the examination field of view of the capsule endoscope.

Figure 7:
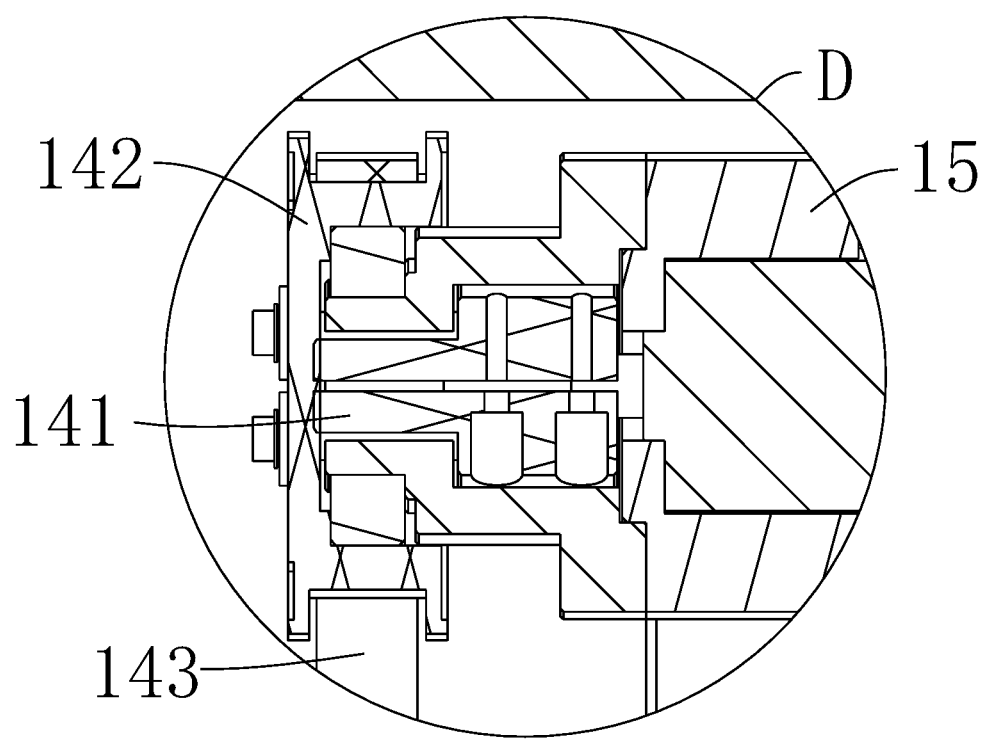
FIG. 7 is an enlarged view of a portion D in FIG. 6.

More specifically, as shown in FIG. 6 and FIG. 7, the drive assembly comprises a first timing belt pulley 142, a timing belt 143 and a second timing belt pulley 144. The first timing belt pulley 142 is connected to the rotating shaft of the second motor 14 through a second coupling 141, and the second timing belt pulley 144 is fixedly connected to the left housing 162a (or the right housing 162b). The first timing belt pulley 142 and the second timing belt pulley 144 rotate synchronously through the timing belt 143 to drive the housing 162 to rotate, thereby realizing the rotation of the magnet 161.

The second direction of the magnetic control device 1 can be set as the length direction Y of the magnetic control device 1 (as shown in FIG. 1). In the follow embodiments, the second direction is the length direction Y as an example.

In another possible design, the left housing 162a and the right housing 162b may also be connected by bolts. Alternatively, the left housing 162a and the right housing 162b may be fixedly connected by other methods which should be able to achieve a fixed connection between the left housing 162a and the right housing 162b.

Figure 4:
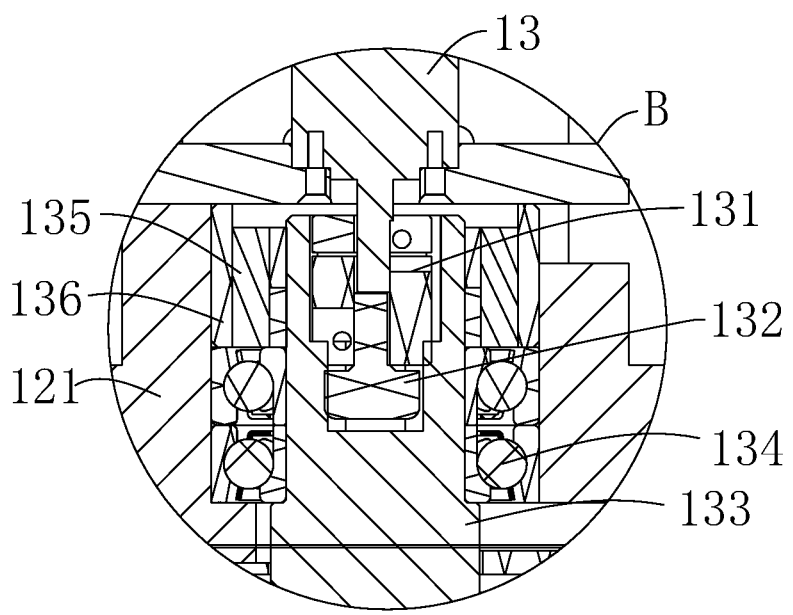
FIG. 4 is an enlarged view of a portion B in FIG. 3.

As shown in FIG. 1, FIG. 3 and FIG. 4, further, there is a space between the upper base 121 and the lower base 122. The rotating shaft of the first motor 13 is connected to one end of a connecting shaft 132 through a first coupling 131, the other end of the connecting shaft 132 is mounted on a spindle 133, and the spindle 133 extends to be connected to the lower base 122 along the height direction Z of the magnetic control device 1, so that the first motor 13 controls the lower base 122 to rotate. The housing 162 is mounted on the lower base 122 through the connecting plate 122a, so that the first motor 13 drives the housing 162 to rotate. The rotation of the first motor 13 which is connected to the spindle 133 through the first coupling 131 and the connecting shaft 132 transmits torque, so as to reduce the excessive load on the first motor 13 and protect the first motor 13.

As shown in FIG. 6 and FIG. 7, the second motor 14 is mounted on the lower base 122, and the rotating shaft of the second motor 14 drives the housing 162 to rotate through the drive assembly. The rotation direction of the housing 162 controlled by the first motor 13 is perpendicular to the rotation direction of the housing 162 controlled by the first motor 14.

As shown in FIG. 3 and FIG. 4, specifically, a bearing 134 and a locking nut 135 are sleeved on the spindle 133. The spindle 133 passes through the upper base 121, is rotatably connected to the upper base 121 through the bearing 134 and is locked by two locking nuts 135 to prevent the spindle 133 from moving when the magnetic control device 1 is inverted, and a shaft sleeve 136 is sleeved outside the locking nut 135 to prevent the spindle 133 from being deviated by vibration.

In order to facilitate subsequent operations for an operator after the magnetic control device 1 is powered on and initialized, in one possible design of the present invention, the magnetic control device 1 further comprises at least one rotation origin detection mechanism for determining whether the magnetic component 16 is at an origin of rotation (i.e., the origin of rotation of the magnet 161). The rotation origin detection mechanism at least comprises a switch assembly electrically connected to the first motor 13 and/or the second motor 14, and a switch mating member cooperates with the switch assembly to control the on/off of a control circuit.

It should be noted that, in the present design, the origin of rotation may be the origin of rotation (also referred to as a first zero point) of the magnetic component 16 around the first axis L1, or may be the origin of rotation (also referred to as a second zero point) of the magnetic component 16 around the axis L2. In some cases, it may be considered that when the magnetic component 16 is at the first zero point, the N pole of the magnet 161 is facing upward and the S pole of the magnet 161 is facing downward. In other cases, other postures of the magnetic component 16 may be used as the zero-point position, for example, the S pole of the magnet 161 is facing upward, the N pole of the magnet 161 is facing downward, etc., as long as it is convenient to control the capsule endoscope.

In order to detect and control whether the magnet 161 moves to the first zero point and/or the second zero point, in one possible design of the present invention, the rotation origin detection mechanism is mounted between the upper base 121 and the lower base 122, the switch assembly is mounted on one of the upper base 121 or the lower base 122, and the switch mating member is mounted on the other of the upper base 121 and the lower base 122. The first motor 13 is controlled to start and stop by relative rotation between the switch assembly and the switch mating member. In another possible design, the rotation origin detection mechanism is mounted at a position where the lower base 122 and the magnetic component 16 are connected, the switch assembly is mounted on one of the lower base 122 or the magnetic component 16, and the switch mating member is mounted on the other of the lower base 122 or the magnetic component 16. The second motor 14 is controlled to start and stop through a relative rotation between the switch assembly and the switch mating member.

In one possible design, the switch assembly is a photoelectric switch 18, the switch mating member is a code disk 19, and the code disk 19 is provided with a detection portion. With a relative rotation between the photoelectric switch 18 and the code disk 19, when the photoelectric switch 18 detects the detection portion, a control circuit of the photoelectric switch is turned off, and the magnetic component 16 stops at the origin of rotation.

As shown in FIG. 3 to FIG. 7, in one possible design, the magnetic control device 1 further comprises a photoelectric switch 18 and a code disk 19. The code disk 19 can rotate relative to the photoelectric switch 18 along with the rotation of the magnet 161, and when the photoelectric switch senses the corresponding detection portion, it is determined that the magnet 161 reaches the origin of rotation. In a specific embodiment, the photoelectric switch 18 is connected to the first motor 13 or the second motor 14 to detect whether the magnet 161 is located at the origin of rotation, and when the magnet 161 rotates to the origin of rotation, the photoelectric switch 18 controls the first motor 13 or the second motor 14 to stop working.

In the embodiment, the code disk 19 can rotate with the magnet 161, and the photoelectric switch 18 detects the rotation position of the magnet 161 by detecting the code disk 19. When the magnet 161 rotates to the origin of rotation, the photoelectric switch 18 can control the first motor 13 and/or the second motor 14 to stop working, so as to control the magnet 161 to stop rotating. This is easy to find the origin of rotation of the magnetic 161, and determine the initial position of the capsule endoscope. Meanwhile, this can determine that the magnet 161 rotates for at least one circle, so that the capsule endoscope in vivo is driven to rotate for at least one circle through the change of the magnetic field of the magnet 161, and that the capsule endoscope can observe the internal conditions of human stomach more completely.

Alternatively, in the embodiments of the present invention, the rotation of the magnetic component 16 may also be controlled according to actual rotation circles of the magnet 161 (that is, the number of times that the magnet 161 passes through the origin of rotation is detected). For example, a threshold value of the number of times that the photoelectric switch 18 detects that the magnet 161 passes the origin of rotation can be set, and when it is detected that the number of times that the magnet 161 passes through the origin of rotation exceeds the threshold value, the photoelectric switch 18 can control the first motor 13 and/or the second motor 14 to stop working. Specifically, the threshold value may be set to 150, that is, the photoelectric switch 18 detects that the magnet 161 passes through the origin of rotation 150 times.

As shown in FIG. 6 and FIG. 7, in one possible design, the code disk 19 comprises a first code disk 191, the photoelectric switch 18 comprises a first photoelectric switch 181, and the detection portion comprises a first detection portion disposed on the first code disk 191. The first code disk 191 is mounted on the lower base 122, the first photoelectric switch 181 is mounted on the upper base 121, the first photoelectric switch 181 is provided with a first groove 181a, and the first photoelectric code disk 191 is provided with a first detection portion. When the first detection portion of the first code disk 191 is located in the first groove 181a, the first detection portion can control the start and stop of the control circuit in cooperation with the first photoelectric switch 181. That is, an initial rotation position of the first detection portion (when is not powered on) is located in the first groove 181a, and when the first photoelectric switch 181 detects that the first detection portion is located in the first groove 181a, the magnet 161 is located at the first zero point, and the first code disk 191 can drive the first detection portion to rotate with the lower base 122. When the first photoelectric switch 181 detects that the first code disk 191 is located in the first groove 181a again, the magnet 161 returns to the first zero point, and the first photoelectric switch 181 controls the first motor 13 to stop working. When the first code disk 191 rotates one revolution, the first detection portion passes through the first groove 181a once.

Specifically, in some embodiments of the present invention, the first detection portion is a light barrier, and the light barrier is disposed on the outer edge of the first code disk 191 and can rotate with the rotation of the magnet 161. In the embodiment, the upper base 121 is fixed on the mounting base 11 and does not rotate, the first motor 13 controls the lower base 122 to rotate so as to drive the first code disk 191 and the magnet 161 to rotate, and the first photoelectric switch 181 detects the rotation position of the magnet 161 by detecting a light barrier of the first code disk 191. When the light barrier of the first code disk 191 rotates to the first groove 181a again, the magnet 161 returns to the first zero point, and the light barrier shields light beams in the first groove 181a, so that the first photoelectric switch 181 detects the first code disk 191 and automatically turns off, and the first photoelectric switch 181 is electrically connected to the power supply of the first motor 13. Further, the power supply of the first motor 13 is cut off, and the first motor 13 is controlled to stop working.

Alternatively, in other embodiments of the present invention, the first detection portion may also have other structures as long as the magnet 161 can be controlled to stop at the origin of rotation. For example, the first detection portion is an annular thin-wall light barrier disposed on the outer edge of the first code disk 191, and the light barrier is provided with an opening or a transparent portion. When the opening or the transparent portion is located inside the first groove, the first photoelectric switch 18 can stop the magnet 161 at the origin of rotation by controlling the first motor 13. In a specific application, according to the different types of photoelectric switch (for example, an opposite type photoelectric switch, a slot type photoelectric switch, etc.), the first detection portion that can be cooperated with the photoelectric switch can be selected, specifically not to repeat, as long as it can control the magnetic component 16 to stop exactly at the origin of rotation.

Figure 5:
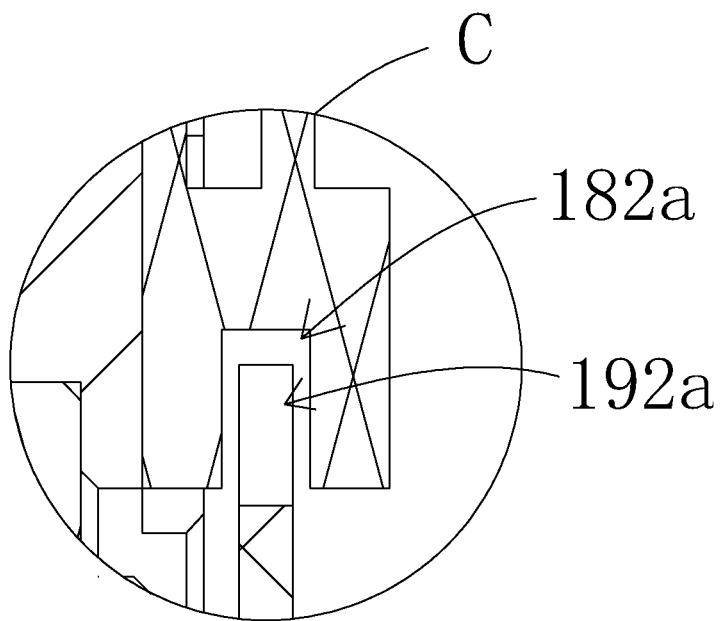
FIG. 5 is an enlarged view of a portion C in FIG. 3.

As shown in FIG. 3 and FIG. 5, in one possible design, the housing 162 is rotatably mounted on the lower base 122 via a shaft portion 162d, the code disk 19 further comprises a second code disk 192, and the photoelectric switch 18 further comprises a second photoelectric switch 182. The second code disk 192 is mounted on the housing 162 or the shaft portion 162d of the housing 162, the second photoelectric switch 182 is mounted on the connecting plate 122a, the second photoelectric switch 182 is provided with a second groove 182a, and the detection portion comprises a second detection portion disposed on the second code disk 192. When the second detection portion of the second code disk 191 is located in the second groove 182a, the second detection portion can control the start and stop of the control circuit in cooperation with the second photoelectric switch 182. That is, the initial rotation position of the second detection portion (when is not powered on) is located in the second groove 182a, the second code disk 192 drives the second detection portion to rotate with the housing 162, and when the second photoelectric switch 182 detects that the second detection portion is located in the second groove 182a again, the magnet 161 returns to the origin of rotation (the second zero point), and the second photoelectric switch 182 controls the second motor 14 to stop working. For each revolution of the second code disk 192, the second detection portion passes through the second groove 182a once.

Specifically, in some embodiments of the present invention, the second detection portion may be an opening 192a, and the opening 192a is disposed at the edge of the second code disk 192 and can rotate with the rotation of the magnet 161. In the embodiment, the housing 162 is rotatably connected to the connecting plate 122a, the second motor 14 controls the rotation of the housing 162 to drive the second code disk 192 and the magnet 161 to rotate, and the second photoelectric switch 182 detects the rotation position of the magnet 161 by detecting the opening 192a of the second code disk 192. When the opening 192a of the second code disk 192 rotates to the second groove 182a again, the magnet 161 returns to the origin of rotation (the second zero point), and the opening 192a connects the light beams in the second groove 182a, so that the second photoelectric switch 182 detects the opening 192a of the second code disk 192 and automatically turns off. The second photoelectric switch 182 is electrically connected to the power supply of the second motor 14, so as to cut off the power supply of the second motor 14 and control the second motor to stop working.

Alternatively, in other embodiments of the present invention, the second detection portion may have other structures according to different types of photoelectric switch 18, as long as the magnet 161 can be controlled to stop at the second zero point. It is not repeated here.

It is worth mentioning that the switch assembly is a microswitch group, and the switch mating member is a contact mating portion. With a relative rotation between the microswitch group and the contact mating portion, when the microswitch group detects the contact mating portion, the control circuit of the microswitch group is disconnected, and the magnetic component 16 stops at the origin of rotation.

The microswitch group is electrically connected to the first motor 13 and/or the second motor 14, and comprises a microswitch and a contact part, wherein the microswitch is provided with a contact mating portion which can be cooperated with the contact part, and the on/off of the control circuit is controlled by the contact and separation of the contact part and the contact mating portion. The microswitch group is disposed at the origin of rotation of the magnetic control device 1, one of the contact part and the microswitch is configured to rotate with the rotation of the magnet 161, and the other is fixed, and the two can cooperate with each other to control the on/off of the circuit, so that the magnetic control device 1 can stop at the origin of rotation.

In order to adjust the first motor 13 and the second motor 14 respectively, at least two microswitches are provided to control the magnet 161 to stop at the first zero point and control the magnet 161 to stop at the second zero point respectively. In a specific embodiment, the microswitch group (not shown in FIGs) is disposed on the upper base 121, the contact part (not shown in FIGs) is an action reed, and the contact mating portion (not shown in FIGs) is a bump disposed on the lower base 122 and protruding toward the microswitch group, and the bump rotates with the lower base 122. When the bump contacts with the action reed, the microswitch controls the first motor 13 to turn off, and the magnet 161 stops at the first zero point. In addition, the microswitch group is also disposed on the lower base 122, and the bump is disposed on the shaft portion 162d of the housing 162 of the magnetic component 16 and rotates with the housing 162. When the bump contacts with the action reed, the microswitch controls the second motor 14 to turn off, and the magnet 161 stops at the second zero point, which is convenient for an operator to use.

The person skilled in the art realizes that the present invention by no means is limited to the preferred embodiments described above. On the contrary, many modifications and variations are possible within the scope of the appended claims. Any modifications, equivalent substitutions, improvements, etc. made within the spirit and principles of this disclosure are intended to be included within the scope of the present invention.

The invention claimed is:

1. A magnetic control device for controlling a capsule endoscope, comprises:
    a mounting base for hoisting the magnetic control device;
    a base connected to the mounting base;
    a magnetic component, comprising a magnet for driving the capsule endoscope to rotate;
    a first motor for controlling the magnetic component to rotate around a first axis, wherein the first motor passes through the mounting base and is mounted on the base along a first direction of the magnetic control device; and
    a second motor for controlling the magnetic component to rotate around a second axis,
    wherein the second motor is mounted on the base;
    the first axis intersects the second axis;
    the base comprises an upper base and a lower base;
    the upper base is located between the mounting base and the lower base along the first direction of the magnetic control device, and a space between the mounting base and the lower base is a mounting space;

the first motor is mounted on the upper base; and the second motor is connected to the lower base and is disposed in the mounting space between the mounting base and the lower base:

the magnetic control device further comprises a conductive slip ring, and the conductive slip ring comprises an upper slip ring and a lower slip ring; and the upper slip ring is mounted on the upper base and is electrically connected to a power supply of the magnetic control device, and the lower slip ring is mounted on the lower base and is electrically connected to the second motor.

2. The magnetic control device of claim 1, wherein an outer edge of the lower base extends beyond an outer edge of the upper base.

3. The magnetic control device of claim 1, wherein the magnetic control device further comprises a mounting plate connected to the base; and at least part of the mounting plate extends to the mounting space, and the second motor is connected to the base through the mounting plate.

4. The magnetic control device of claim 3, wherein the conductive slip ring is a PCB type slip ring, and the thickness of the PCB type slip ring is less than or is equal to 10 mm.

5. The magnetic control device of claim 4, wherein the magnetic component comprises a housing; and the housing comprises a left housing and a right housing, wherein the left housing is connected to the right housing through a flange, and the magnet of the magnetic component is secured in the housing.

6. The magnetic control device of claim 5, wherein two ends of the lower base are provided with connecting plates along a second direction of the magnetic control device, and the connecting plates extend away from the upper base along the first direction of the magnetic control device; and the housing is located between the two connecting plates and is rotatably connected to the two connecting plates, and the housing rotates as driven by the first motor and the second motor.

7. The magnetic control device of claim 6, wherein the magnetic control device further comprises at least one rotation origin detection mechanism for determining whether the magnetic component is at an origin of rotation; and the rotation origin detection mechanism comprises a switch assembly electrically connected to the first motor and/or the second motor, and a switch mating member cooperates with the switch assembly to control the on/off of a control circuit.

8. The magnetic control device of claim 7, wherein the rotation origin detection mechanism is mounted between the upper base and the lower base, the switch assembly is mounted on one of the upper base or the lower base, and the switch mating member is mounted on the other of the upper base or the lower base; and wherein the first motor is controlled to start and stop through a relative rotation between the switch assembly and the switch mating member.

9. The magnetic control device of claim 7, wherein the rotation origin detection mechanism is mounted at a position where the lower base and the magnetic component are connected;

the switch assembly is mounted on one of the lower base or the magnetic component;

the switch mating member is mounted on the other of the lower base or the magnetic component; and wherein the second motor is controlled to start and stop through a relative rotation between the switch assembly and the switch mating member.

10. The magnetic control device of claim 7, wherein the switch assembly is a photoelectric switch, the switch mating member is a code disk, and the code disk is provided with a detection portion; and along with a relative rotation between the photoelectric switch and the code disk, when the photoelectric switch detects the detection portion, a control circuit of the photoelectric switch is disconnected, and the magnetic component stops at the origin of rotation.

11. The magnetic control device of claim 7, wherein the switch assembly is a microswitch group, and the switch mating member is a contact mating portion; and along with a relative rotation between the microswitch group and the contact mating portion, when the microswitch group detects the contact mating portion, a control circuit of the microswitch group is disconnected, and the magnetic component stops at the origin of rotation.

12. The magnetic control device of claim 1, wherein the first motor and/or the second motor is a DC motor or a stepper motor, so that the magnetic control device does not need an encoder and/or a reducer.

* * * * *